T. A. SMITH.
TIRE RIM LOCKING DEVICE.
APPLICATION FILED DEC. 2, 1918.

1,307,461.

Patented June 24, 1919.

INVENTOR
Theron A. Smith
BY John A. Claismith
HIS ATTORNEY

UNITED STATES PATENT OFFICE.

THERON A. SMITH, OF SAN JOSE, CALIFORNIA.

TIRE-RIM-LOCKING DEVICE.

1,307,461.  Specification of Letters Patent.  Patented June 24, 1919.

Continuation in part of application Serial No. 180,206, filed July 12, 1917. This application filed December 2, 1918. Serial No. 265,005.

*To all whom it may concern:*

Be it known that I, THERON A. SMITH, a citizen of the United States, and a resident of San Jose, in the county of Santa Clara and State of California, have invented certain new and useful Improvements in Tire-Rim-Locking Devices, of which the following is a specification, this application being a continuation in part of my prior application filed July 12, 1917, Serial No. 180,206.

The object of this invention is to provide a quickly and easily demountable rim for vehicle wheels with means for securely locking the rim against creeping and against lateral movement. Also to provide a device of the character indicated that will be simple in construction and operation, strong, and economical to manufacture, and that includes no threaded part or parts that require detaching and removal in order to remove the said rim.

The nature and objects of my invention will be further and more fully understood by the following description in connection with the accompanying drawings, wherein—

Similar characters of reference indicate similar parts throughout the several views.

Figure 1:
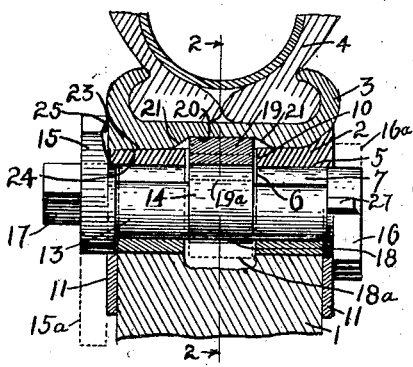
Figure 1 illustrates a transverse section through a wheel embodying my invention, parts being broken away.

In the drawings 1 indicates the felly of the wheel, 2 the felly band, 3 the wheel rim and 4 the tire. At 5 is shown a bearing plate having a slot 6 formed longitudinally through the center thereof and a groove 7 formed transversely through the center thereof. Bearing plate 5 is inserted in recess 8 formed in felly 1 and is securely fastened to the under side of band 2 by rivets 9. In rim 2 and of substantially the same size as slot 6 and in alinement therewith, is formed slot 10. A plate as 11 is secured to each side of felly 1 by bolts 12 as shown.

Cam-bolt 13 is provided with a cam 14 on its central portion and a larger cam upon each end as at 15 and 16 respectively, cam 15 bearing a square headed portion 17 to which a wrench may be applied. Upon cam 14 is mounted locking member 18 having a head 19 adapted to operate freely through slot 10 in rim 2. Cam-bolt 13 is placed in position in groove 7 with locking member 18 in recess 8 before rim 2 is placed in position. When ring 2 is placed in position said cam-bolt 13 and the locking member 18 are permanently secured in place.

A recess 20 is formed in the under side of rim 3 having rounded sides 21 but more abrupt ends as at 22, its general dimensions being such as to easily engage locking member 19 when the same is thrown forward. To facilitate the quick and easy removal and replacing of rim 3 on band 2 the inner portions of their opposed peripheries are beveled as indicated at 23 and 24 respectively.

Figure 2:
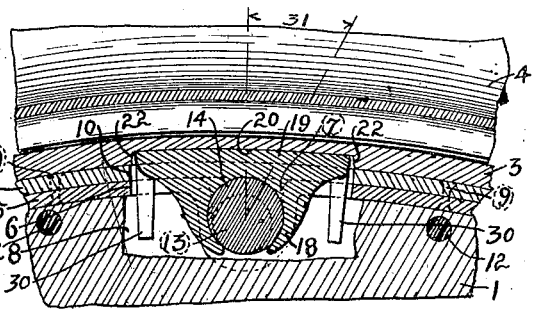
Fig. 2 is a sectional view on line 2—2 of Fig. 1.
Figure 3:
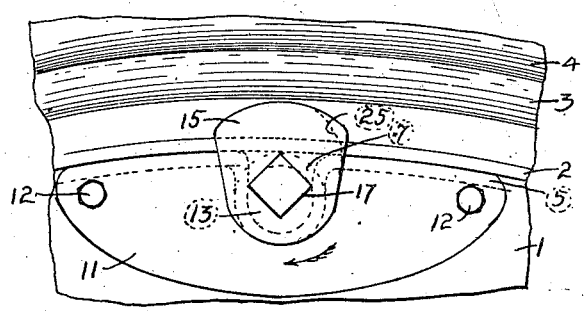
Fig. 3 is a left end elevation of my improved locking device in the operative position shown in Fig. 1.
Figure 4:
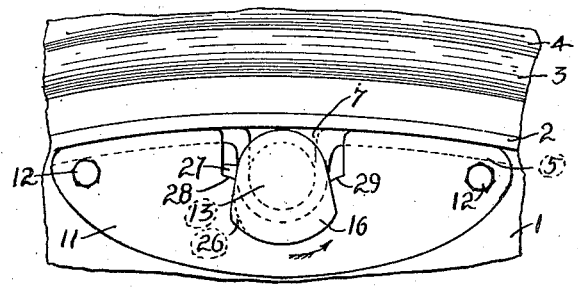
Fig. 4 is a right end elevation of my improved locking device in the operative position shown in Fig. 1.

Assuming now that the various parts are in the several positions indicated in dotted lines in the several figures, the proper numeral followed by a letter indicating the retracted positions of the parts referred to. Rim 3 carrying tire 4 has been slipped into position on band 2 so that the recess 20 coincides with slot 10. A proper tool being now applied to part 17, cam-bolt 13 is turned in the direction indicated by the arrow in Fig. 3 into the position shown. By this action cam 14 forces locking member 19 forward to engage recess 20 in rim 3 as shown in Figs. 1 and 2 and at the same time cam 15 is turned through the same angle to engage the outer surface of rim 3 as shown, and cam 16 is turned through the same angle to engage the surface of plate 11, the inner edges of cams 15 and 16 being cut away as indicated at 25 and 26 respectively so as to more readily engage their respective surfaces.

Cam 16 is provided with a stop 27 positioned so as to engage shoulder 28 in plate 11 when the device is turned to the desired operative position, and to engage shoulder 29 formed in plate 11 on the opposite side of cam-bolt 13 when the device is turned into the desired inoperative position. Head 19 of locking member 18 may be provided with inwardly projecting legs 30 to engage the bottom of recess 8 when the device is in an inoperative position, thereby preventing the said head from dropping over and binding in an inoperative position, or throwing one end upwardly and preventing the removal of rim 3.

When cam-bolt 13 is turned back to place the various parts in the positions indicated in dotted lines in order to free rim 3 for removal, the end cam 15 is caused to ride up on plate 11 at the same time that end cam 16 is caused to ride up on felly band 2, the engagement of both end cams securely holding the several parts in an inoperative position during the removal and replacement of rim 3.

In this method of locking the rim in position the rim has a solid seat on band 2 throughout its entire width and length. It is held solidly against transverse movement by the usual beveled surfaces and the positive lateral binding effect of cam 15 against the rim itself and cam 16 against the solid felly, as well as the radially directed engagement of head 19 in recess 20. When the cam-bolt 13 is turned into an operative position it is so formed that when stop 27 engages shoulder 28 the center cam 14 is slightly past the dead center as indicated at 31 in Fig. 2. This feature in conjunction with recess 20 prevents the creeping of the rim and forms a lock for the bolt since the greater the backward pressure of the rim the tighter the member 18 will hug cam 14.

It is understood of course that I do not wish to confine myself to the specific form of the invention herein shown and described, but to include all changes in form, construction and operation that may be included within the scope of the appended claims.

I claim:

1. The combination with a wheel body and a demountable rim and means for preventing the inward displacement of said rim on said wheel body, of a plurality of holding devices for said rim, each device comprising a cam-bolt operatively mounted in said wheel-body and passing transversely therethrough, a cam formed on the central portion of said cam-bolt, a locking member mounted on said cam and adapted to engage said rim when forced outwardly by the rotation of said cam, and terminal members on said cam-bolt coacting with said locking member and adapted to engage said rim and said wheel body and thereby prevent the outward displacement of said rim.

2. The combination of a wheel body, a demountable rim in operative engagement therewith, means for preventing the inward displacement of said rim on said wheel body, a plurality of holding devices for said rim, each device including an oscillatory member operatively mounted in said wheel body and passing transversely therethrough, means operable by said oscillatory member for effecting radial pressure between said wheel body and said rim when forced outwardly by the rotation of said oscillatory member, means operable by said oscillatory member and coacting with said second mentioned means for engaging the inner portion of said wheel body when in an operative position to prevent lateral displacement of said oscillatory member, and means operable by said oscillatory member and coacting with said second and third mentioned means for effecting lateral pressure upon the outer edge of said rim when in an operative position.

3. The combination of a wheel body, a demountable rim in operative engagement therewith, means for preventing the inward displacement of said rim on said wheel body, a plurality of holding devices for said rim, each device including an oscillatory member operatively mounted in said wheel body and passing transversely therethrough, means operable by said oscillatory member for effecting radial pressure between said wheel body and said rim when forced outwardly by the rotation of said oscillatory member, means operable by said oscillatory member and coacting with said second mentioned means for engaging the inner portion of said wheel body when in an operative position to prevent lateral displacement of said oscillatory member, means operable by said oscillatory member and coacting with said second and third mentioned means for effecting lateral pressure upon the outer edge of said rim when in an operative position, and means for engaging said third and fourth mentioned means when in an inoperative position to hold the same against movement.

4. In combination with a wheel body, a demountable rim and means for preventing the inward displacement of said rim on said wheel body, a cam-bolt operatively mounted in said wheel body and transversely thereof and having a cam formed on its central portion, a locking member mounted on said cam adapted to engage said rim when forced outwardly by the rotation of said cam, oppositely directed terminal members on said cam-bolt adapted to simultaneously engage the outer edge of said rim and the inner portion of said wheel body, means for securing said cam-bolt against movement when in an inoperative position, and means for limiting the range of movement of said cam-bolt.

Executed this 26th day of November, 1918.

THERON A. SMITH.